Patented June 29, 1943

2,323,130

UNITED STATES PATENT OFFICE 2,323,130

POLYMERIZED CHLOROPRENE-CASHEW NUT SHELL LIQUID COMPOSITION

Mortimer T. Harvey, East Orange, N. J., assignor to The Harvel Corporation, a corporation of New Jersey No Drawing. Application May 26, 1939,
Serial No. 275,899

3 Claims. (Cl. 260—42)

The present invention relates generally to compositions of matter made up of polymerized chloroprene and thickened cashew nut shell liquid and more particularly to rubber-like compositions made up of polymerized chloroprene and thickened cashew nut shell liquid.

I have discovered that various kinds of articles of rubber-like nature can be made up with polymerized chloroprene and thickened cashew nut shell liquid in which the resulting compositions can be of a texture ranging from the resilient rubber-like state to the hard, rigid state, depending on the use in which each particular kind of article is to be employed.

It is to be understood that the polymerized chloroprene and thickened cashew nut shell liquid can be brought into intimate mixture with each other either before or after or during intermixture with some other material such as plasticisers, fillers and vulcanizers, for example.

"Cardolite" is a trade-mark name for cashew nut shell liquid which has been polymerized to various stages and consistencies, with or without other treatment to obtain certain characteristics. "Cardolite" 816 is cashew nut shell liquid which has been polymerized to a thick liquid. "Cardolite" 446 is cashew nut shell liquid which has been polymerized to a resilient, rubber-like state. "Cardolite" 619 is cashew nut shell liquid which has been polymerized to a thick liquid state and then condensed with a reactive methylene group to a tough mass. "Cardolite" 869 is obtained by first steam distilling cashew nut shell liquid to obtain a distillate called cardanol, which is a phenol with an unsaturated hydrocarbon sidechain, (see Harvey Patent No. 2,098,824), after which the cardanol is polymerized to a heavy liquid and then condensed with a reactive methylene group to form a tough mass.

"Micronex" and "Gastex" are the trade-mark names of carbon blacks to be found on the market under those names.

In the following examples polymerized chloroprene is identified by some of its trade-mark names neoprene and "Duprene."

Example 1

A mixture made up of the following, in parts by weight indicated by the corresponding figures, was milled together on a rubber mixing mill or rolls:

| | |
|---|---|
| "Neoprene" type G | 100 |
| Extra light calcined magnesia | 4 |
| "Cardolite" 446 | 50 |
| "Micronex" | 36 |
| Di ortho tolyl guanidine | 2 |
| Zinc oxide | 5 |

Example 2

A mixture was made up in the manner of that of Example 1 as follows:

| | |
|---|---|
| "Neoprene" type G | 100 |
| Extra light calcined magnesia | 4 |
| "Micronex" | 36 |
| "Cardolite" 816 | 50 |
| Di ortho tolyl guanidine | 2 |
| Zinc oxide | 5 |

Example 3

In another similar mixture, the parts are as follows:

| | |
|---|---|
| "Neoprene" type G | 100 |
| Extra light calcined magnesia | 4 |
| "Micronex" | 36 |
| "Cardolite" 869 | 50 |
| Di ortho tolyl guanidine | 2 |
| Zinc oxide | 5 |

Example 4

Another similar example was made up of the following parts:

| | |
|---|---|
| "Neoprene" type G | 100 |
| Extra light calcined magnesia | 4 |
| "Micronex" | 36 |
| "Cardolite" 619 | 50 |
| Di ortho tolyl guanidine | 2 |
| Zinc oxide | 5 |

Various tests on the mill-mixed compositions of Examples 1 to 4, above, after curing at various temperatures showed these compositions to have good characteristics of ageing; resistance to solvents such as kerosene, gasoline and benzol; degree of swelling in liquids such as water, kerosene and benzol; compression set; hardness; stress strain and other characteristics. These compositions in the uncured state have good plasticity stability.

Example 5

Another mixture similarly made up, contained the following parts:

| | |
|---|---|
| "Neoprene" type G | 100 |
| Magnesia | 8 |
| "Gastex" | 56 |
| "Cardolite" 446 | 100 |
| Zinc oxide | 10 |
| Hexamethylene tetramine | 8 |

Example 6

A further mixture similarly made up, has the following composition:

| | |
|---|---|
| "Neoprene" type G | 150 |
| Magnesia | 6 |
| "Gastex" | 56 |
| Amyl ether of cashew nut shell liquid, thickened by heating | 50 |
| Zinc oxide | 10 |
| Hexamethylene tetramine | 2 |

In the above disclosure and in the appended claims it is considered that the name "chloroprene" is a technical name for 2-chlor-butadiene.

Having thus described my invention, what I claim is:

1. A composition of matter comprising a cured intimate mixture of polymerized chloroprene and an organic condensation product of polymerized cashew nut shell liquid and hexamethylene tetramine, the ratio of the quantity by weight of said polymerized chloroprene to the quantity by weight of said organic condensation product being as great as about 1 to 1.

2. A cured composition of matter comprising an intimate mixture of polymerized chloroprene and the organic reaction product of hexamethylene tetramine with cashew nut shell liquid which has been thickened by polymerization to a resilient, rubbery state, the ratio of the quantity by weight of said polymerized chloroprene to the quantity by weight of said organic reaction product being as great as about 1 to 1.

3. A cured composition of matter comprising an intimate mixture of polymerized chloroprene and the organic reaction product of hexamethylene tetramine with cashew nut shell liquid which has been polymerized to a thick liquid state, the ratio of the quantity by weight of said polymerized chloroprene to the quantity by weight of said organic reaction product being as great as about 1 to 1.

MORTIMER T. HARVEY